Nov. 19, 1935.   G. D. GARDNER   2,021,300
SLICING MACHINE
Filed Jan. 17, 1934
Fig. 1.
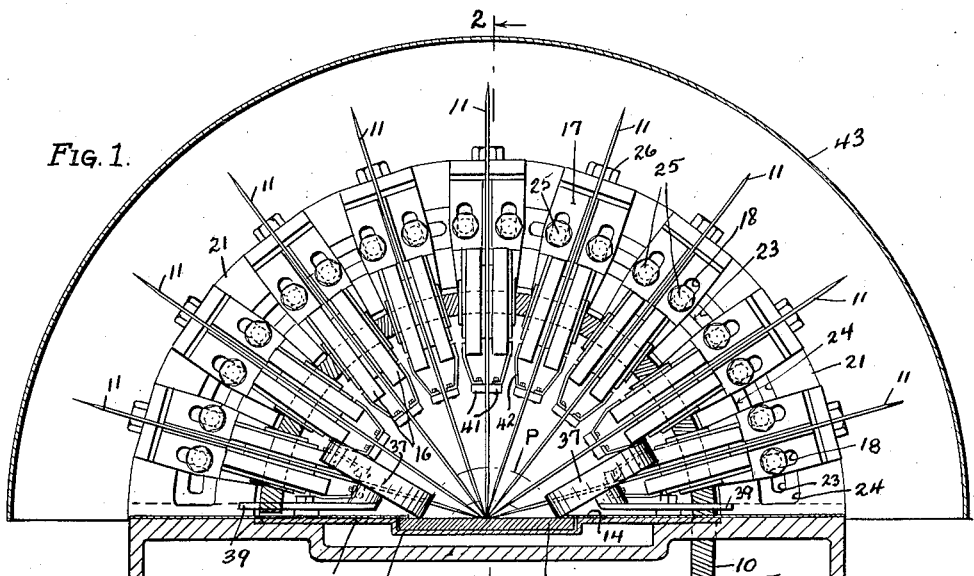
Fig. 3.
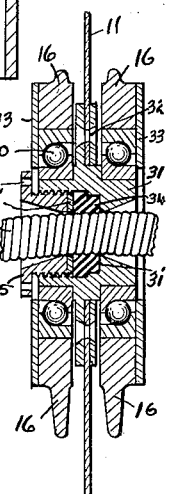
Fig. 2.
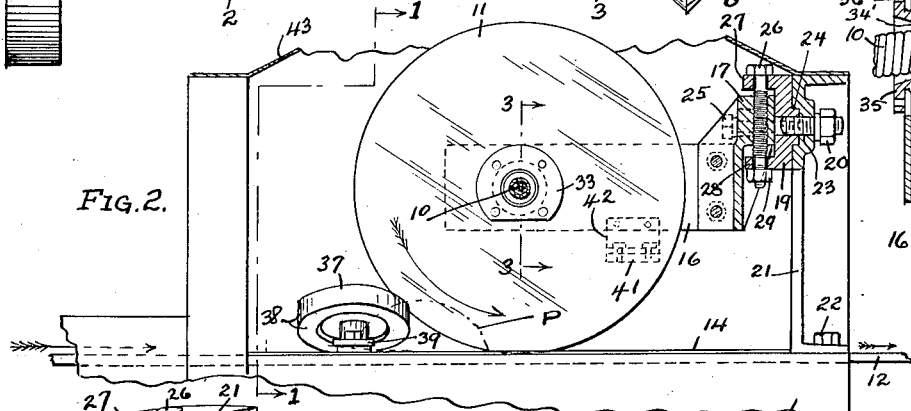
Fig. 4.
Fig. 5.
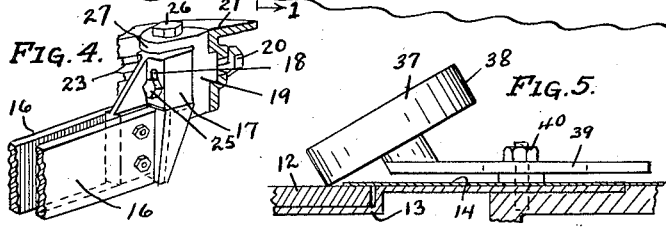
INVENTOR.
GEORGE D. GARDNER
BY Miller Boyken & Bried
ATTORNEYS.

Patented Nov. 19, 1935

2,021,300

UNITED STATES PATENT OFFICE 2,021,300

SLICING MACHINE

George D. Gardner, San Jose, Calif.

Application January 17, 1934, Serial No. 706,975

10 Claims. (Cl. 146—99)

This invention relates to fruit machines as used for slicing fruit preparatory to canning and has for its objects an improved gang disk type slicer which is simple in construction and overcomes the requirement of using gears between the disks for driving the same, and also provides for easy adjustment and spacing of the disks, as well as for their assembling or disassembling. Other features and advantages of the invention will appear in the following description and accompanying drawing.

Briefly described the machine consists of a traveling belt which carries the fruit, such as a half peach, along in single file, while a fan-shaped battery of cutting disks, with their cutting edges all converging at the surface of the belt, rolls over the half peach and cuts it into a plurality of wedge-shaped slices, similar to those cut by a housewife in the slicing of peaches for the table. It is to the mounting and driving of these disks to which the invention chiefly pertains as I do away with the usual gears used to drive one disk from the other and instead I connect all the disks together on a flexible metal shaft made in the form of a wire spiral.

In the drawing Fig. 1 is a front elevation of the machine showing the battery of cutting disks converging upon the belt, and as seen from line 1—1 of Fig. 2.

Fig. 2 is a reduced size cross section of Fig. 1 as seen from the line 2—2 of Fig. 1.

Fig. 3 is an enlarged cross section through any of the disks showing the manner of clamping the disks to the flexible shaft.

Fig. 4 is a broken perspective view of a part of one of the adjustable disk supporting brackets.

Fig. 5 is an enlarged view showing one of the fruit centering idlers mounted on its supporting bracket.

In further detail the machine comprises a base or frame 1 preferably of cast iron provided with suitable bearings 2, 3, supporting a driving shaft 4 driven by any desired means such as the pulley 5, and secured to which shaft is a driving pinion 6 in mesh with a driven pinion 7 provided with a tubular metal bushing 8 secured to and projecting through a bearing 9 also carried by the frame and from the bore of which tubular bushing projects a flexible driving shaft 10 which extends in a semi-circular path through the center of nine steel cutting disks 11, as indicated, which are (generally about a foot in diameter) arranged in fan formation with their lower converging edges substantially touching one another and also just touching the surface of a rubber or other waterproof endless conveyor belt 12 which rides under the disks in a guiding trough 13 preferably of any metal not acted upon by fruit juices. This trough is supported on frame 1 and also provided are thin strips of brass 14 secured to the wide flanges or margins 15 of the trough and arranged to overlap the opposite margins of the belt to hold it in place.

Each circular cutting disk is a thin blade like a circular saw but with a plain cutting edge and each is positioned between the horizontally extending arms 16 of a bracket 17 which in turn is bolted through radial slots 18 to a block 19 as by tap bolts 25 in turn clamped as by a stud bolt 20 to a semi-circular cast bracket 21 which arches over the belt and is firmly secured to opposite margins of the frame 1 as by bolts 22. This semi-circular bracket is provided with arcuate slots 23 struck from the center of convergence of the disks at the belt, and block 19 has a lug slidably fitting in a correspondingly curved seat 24 so that the blocks may be arcuately adjusted along the bracket 21 in the seat 24 and locked by bolts 20 at any point.

Brackets 17 may also be raised and lowered with respect to blocks 19 by means of vertical bolts 26 passing freely through short upper and lower arms 27, 28 and threaded through bracket member 17, so that by turning the bolt 26 (with bolts 25 released) the brackets may be accurately adjusted up or down and locked by clamp nuts 29.

Arms 16 serve as bearing supports for each disk, each arm being provided with an annular ball bearing 30 fitted over opposite ends of a tubular hub 31 permanently secured to the disk as by rivets 32, and the ball bearings are retained in circular recesses in the arms 16 as by outer flange plates 33.

The interior of tubular hub 31 is threaded from one end to about the center into which is screwed a sleeve 35 interiorly tapering larger from its inner end toward the outer end, the inner diameter of the inner end being about the diameter of shaft 10 and the opposite end of tubular member 31 is interiorly formed to taper outwardly from a diameter at its inner end of about that of shaft 10 to about the same inner diameter at its outer end as the inner diameter of the outer end of sleeve 35. The tubular member 31 is shouldered at its inner end as at 31', and between the shoulder 31' and the inner end of the sleeve 35 is a space in which is positioned a rubber or felt washer 34 with a metal washer 34' adjacent the side of the sleeve. Thus, when the sleeve 35 is tightly screwed into the tubular member 31, the washer 34 is compressed and forced against the shaft 10, tightly gripping the shaft while providing sufficient resiliency to permit flexing of the shaft during its rotation, and yet retaining the disk absolutely rigid against misalignment while in operation. The interior tapering of the sleeve and tubular member obviously frees the shaft of detrimental wearing contact with said sleeve and tubular member.

Ordinarily the center disk of the group need not be adjusted arcuately on curved bracket 21 though it may sometimes be bodily removed when changing the arrangement of disks for different slicing, and hence slots 23 need not extend past the center bracket or block 17 as it may be clamped to a round hole with its bolt 20. However, this is optional.

The flexible shaft is of the closely twisted spiral spring variety; a particular make made in Germany, has been found very satisfactory. This flexible shaft is composed of several multi-lead spirals of spring wire, one rolled over the other, so that it is virtually a solid coil of springs yet very flexible while virtually free from any torsional "give" at all. The driven end is secured in opposite ends of tubular bushing 8 of gear 9 by means of two of the tapered, threaded, split bushings 35 as explained for the clamping of the disks, and in operation the disks drive simultaneously upon rotating gear 7.

To guide the pieces of fruit, such as halved peaches P centrally of the belt so that they will be centrally sliced, I provide a pair of small wheels 37 angularly arranged with respect to the belt and each provided with soft rubber tires 38 in contact at one edge with the belt so as to rotate therewith. These wheels are carried on bracket arms 39 which may be adjusted in or out from the center of the belt by means of a bolt 40 working in a slot in the arm. By this means the peach halves or other fruits or food items to be sliced are automatically centered on the belt of the two small rolling wheels as they come along one by one and the rubber tires being of soft rubber are adapted to yield to permit passage of larger than average sized fruit without injury to the fruit. There may, of course, be any number of these rollers to gradually center the fruit on the belt.

To prevent the sliced fruit from being carried upward on the slicing disks as well as to keep the disks clean, scrapers 41, preferably of leather or of rubber belting, bear gently against opposite sides of each disk. These scrapers are mounted on small arms 42 extending downwardly from disk supporting bracket arms 16.

An important feature of the improved construction is the adjustability of any or all of the disks to various degrees about the semi-circle, or individually up and down (with screws 26) to bring their converging edges just right with respect to the belt. And while this latter provision must force the driving cable or shaft slightly out of its true curve, it is very successful in practice and admits of an adjustment heretofore never attained.

Any number of disks may be used, or any of them may be quickly removed when desired by releasing the taper clamping bushings 35 and pulling out the cable. As a matter of safety the disk blades are housed over as by a sheet metal cover 43.

Having thus described my improved gang disk slicer, what I claim is:

1. A slicing machine comprising a plurality of circular cutting disks, bearings for the disks arranged along a semi-circle supporting the disks in spaced relation with edges converging toward the center of the circle, and a round flexible shaft of unitary construction and of substantially uniform diameter extending through the centers of the disks for driving the same, means securing the disks to the shaft and means for rotating the shaft.

2. A slicing machine comprising a plurality of circular cutting disks, bearings for the disks arranged along a semi-circle supporting the disks in spaced relation with edges converging toward the center of the circle, and a round flexible shaft of unitary construction and of substantially uniform diameter extending through the centers of the disks for driving the same, and means securing the disks to the shaft comprising a tubular hub on each disk and a resilient member within the hub engaging the shaft arranged and adapted to support the hub on the shaft substantially free of contact between the hub and shaft.

3. A slicing machine comprising a plurality of circular cutting disks, bearings for the disks arranged along a semi-circle supporting the disks in spaced relation with edges converging toward the center of the circle, and a round flexible shaft of unitary construction and of substantially uniform diameter extending through the centers of the disks for driving the same, and means securing the disks to the shaft comprising a tubular hub on each disk of an inside diameter greater than the outside diameter of the shaft provided with a resilient washer in its bore adapted to support the hub substantially free of contact between the hub and shaft, and means arranged and adapted for tightly clamping the washer to the shaft.

4. A slicing machine comprising a plurality of circular cutting disks, bearings for the disks arranged along a semi-circle supporting the disks in spaced relation with edges converging toward the center of the circle, and a round flexible shaft of unitary construction and of substantially uniform diameter extending through the centers of the disks for driving the same, and means securing the disks to the shaft comprising a tubular hub on each disk and a sleeve screwed into the opposite end of the hub, a shoulder formed on said tubular hub and a compressible washer interposed between the sleeve and shoulder clamping the shaft arranged and adapted to support the hub on the shaft substantially free of contact between the hub and shaft.

5. A slicing machine comprising a plurality of circular cutting disks, bearings for the disks arranged along a semi-circle supporting the disks in spaced relation with edges converging toward the center of the circle, and a flexible coiled wire shaft extending through the centers of the disks for driving the same, means securing the disks to the shaft and means for rotating the shaft.

6. In a gang disk slicer, a plurality of circular cutting disks converging toward one point, a traveling cutting table passing said point, and rollers lying adjacent the face of the table arranged at opposite side edges of the table to align passing items on the table with the converging disks, said rollers shod with soft rubber tires slantingly arranged with respect to and touching the table adjacent their peripheries so as to be driven thereby and means adjustably mounting said rollers for movement toward and away from each other while maintaining the rollers in slanted position relative to the table.

7. In a fruit cutting machine of the character described, an arcuately extending flexible coiled wire shaft, means mounting said shaft for rotation on an arcuate axis extending centrally through said shaft longitudinally thereof, a circular cutting disk on said shaft on the arcuately extending portion thereof with the shaft extending through the axis of said disk, means securing said disk to said shaft for rotation therewith and means for rotating the shaft.

8. In a fruit cutting machine of the character described, an arcuately extending flexible coiled wire shaft, means mounting said shaft for rotation on an arcuate axis extending centrally through said shaft longitudinally thereof, a circular cutting disk on said shaft on the arcuately extending portion thereof with the shaft extending through the axis of said disk, means mounting and supporting said disk on said shaft for rotation therewith including a washer of resilient material tightly gripped between the disk shaft arranged and adapted to provide substantially the only portion of said disk mounting and supporting means in direct engagement with said shaft and means for rotating the shaft.

9. In a fruit cutting machine of the character described, an arcuately extending flexible coiled wire shaft, means mounting said shaft for rotation on an arcuate axis extending centrally through said shaft longitudinally thereof, a circular cutting disk on said shaft on the arcuately extending portion thereof with the shaft extending through the axis of said disk, means securing said disk to said shaft for rotation therewith, means for rotating said shaft, and means for supporting and passing objects along a path of travel below the concave side of said arcuately extending shaft for cutting the objects by said cutting disk.

10. In a fruit cutting machine of the character described, a plurality of circular cutting disks converging toward one point, a travelling cutting table passing said point, rollers lying adjacent the face of the table spaced to pass objects on the table therebetween and said objects arranged to align with the converging disks, the peripheral surfaces of said rollers being of soft rubber adapted to yield for passing objects of greater than normal size without injury to said objects and said rollers touching the table adjacent their peripheries so as to be driven thereby.

GEORGE D. GARDNER.